(12) United States Patent
Miller et al.

(10) Patent No.: US 11,917,954 B2
(45) Date of Patent: Mar. 5, 2024

(54) WHEEL TRACK MONITORING SYSTEM FOR AN IRRIGATION SYSTEM

(71) Applicant: LINDSAY CORPORATION, Omaha, NE (US)

(72) Inventors: Mark William Miller, Elkhorn, NE (US); Reece Robert Andrews, Arlington, NE (US)

(73) Assignee: Lindsay Corporation, Omaha, NE (US)

( * ) Notice: Subject to any disclaimer, the term of this patent is extended or adjusted under 35 U.S.C. 154(b) by 375 days.

(21) Appl. No.: 16/984,250

(22) Filed: Aug. 4, 2020

(65) Prior Publication Data

US 2022/0039336 A1 Feb. 10, 2022

(51) Int. Cl.
| | | |
|---|---|---|
| A01G 25/09 | (2006.01) | |
| A01B 69/00 | (2006.01) | |
| A01B 69/04 | (2006.01) | |
| A01G 25/16 | (2006.01) | |

(52) U.S. Cl.
CPC .......... *A01G 25/092* (2013.01); *A01B 69/002* (2013.01); *A01B 69/008* (2013.01); *A01G 25/16* (2013.01); *G05D 2201/0201* (2013.01)

(58) Field of Classification Search
CPC .... A01G 25/092; A01G 25/16; A01B 69/002; A01B 69/008; G05D 2201/0201
See application file for complete search history.

(56) References Cited

U.S. PATENT DOCUMENTS

| | | | |
|---|---|---|---|
| 4,172,551 A | 10/1979 | Johnson | |
| 2006/0027677 A1 | 2/2006 | Abts | |
| 2009/0173147 A1* | 7/2009 | Sandomirsky | .......... E02D 1/022 |
| | | | 73/84 |
| 2012/0010782 A1 | 1/2012 | Grabow | |
| 2013/0018509 A1 | 1/2013 | Korus | |
| 2014/0116735 A1* | 5/2014 | Bassett | .................. A01C 7/203 |
| | | | 172/430 |
| 2014/0326808 A1 | 11/2014 | Malsam | |
| 2017/0295730 A1* | 10/2017 | Abts | .................... A01G 25/092 |
| 2020/0281111 A1* | 9/2020 | Walter | ................ A01B 63/008 |

(Continued)

OTHER PUBLICATIONS

International Search Report and Written Opinion dated Nov. 10, 2021 for PCT/US2021/042460, Filed Jul. 21, 2021 and all references cited therein.

*Primary Examiner* — Chad G Erdman
(74) *Attorney, Agent, or Firm* — Hovey Williams LLP

(57) ABSTRACT

A wheel track monitoring system for an irrigation system monitors the condition of a wheel track and alerts an operator and/or automatically takes corrective action when a wheel track develops ruts or other conditions that may adversely affect operation of the irrigation system. The wheel track monitoring system includes a wheel track condition sensor, a location sensor, and a processing system. The processing system receives and stores wheel track condition data and location data from the sensors as the irrigation system travels across a field and creates a log of wheel track condition data for multiple locations in the field. The processing system also analyzes the wheel track condition data to determine if the condition of the wheel track is unacceptable at any locations in the irrigated field and generates a corrective action signal if the condition is unacceptable.

18 Claims, 3 Drawing Sheets

(56) References Cited

U.S. PATENT DOCUMENTS

| | | | |
|---|---|---|---|
| 2020/0305366 A1* | 10/2020 | Burkey | A01G 25/16 |
| 2021/0051866 A1* | 2/2021 | Davenport | A01G 25/16 |
| 2021/0191413 A1* | 6/2021 | O'Donnell | B60W 40/06 |
| 2022/0207494 A1* | 6/2022 | Sanders | A01G 25/092 |
| 2022/0365496 A1* | 11/2022 | LaRue | A01G 25/16 |

* cited by examiner

WHEEL TRACK MONITORING SYSTEM FOR AN IRRIGATION SYSTEM

BACKGROUND OF THE INVENTION

1. Field of the Invention

The present invention relates to agricultural irrigation systems. More particularly, the invention relates to a wheel track monitoring system for an irrigation system.

2. Background

Agricultural irrigation systems such as center pivot and lateral move irrigation systems are commonly used to irrigate crops. A center pivot irrigation system includes, among other things, a center pivot communicating with a pressurized water supply and a main section that moves about the center pivot to irrigate a circular or semi-circular field. The main section includes a number of mobile support towers connected to the center pivot and to one another by truss-type framework sections. The mobile support towers are supported on wheels that are driven by electric or hydraulic motors. A water distribution conduit is supported by the mobile support towers and framework sections, and a number of sprinkler heads, spray guns, drop nozzles, or other water emitters are spaced along the length of the conduit for irrigating crops below the irrigation system. Lateral irrigation systems are similar except they don't include center pivots and move in a relatively straight line rather than a circle.

Because irrigation systems follow the same path across fields, the wheels of their mobile towers create wheel tracks. These wheel tracks often develop ruts caused by excessive water application on the tracks and compaction of the wet soil by the wheels. Minor ruts are common and generally don't interfere with irrigation system operation, but deeper and/or uneven ruts can cause mobile towers to slip, bog down, and even stop entirely, sometimes causing damage to the towers. Moreover, when a tower slows or stops in a rut, it can get out of alignment with other towers, causing the irrigation system to shut down.

SUMMARY

Embodiments of the present invention solve at least some of the above-described problems and related problems by providing a wheel track monitoring system for an irrigation system that monitors the condition of a wheel track and alerts an operator and/or automatically takes corrective action when a wheel track develops ruts or other conditions that may adversely affect operation of the irrigation system.

An embodiment of the wheel track monitoring system broadly comprises a wheel track condition sensor, a location sensor, and a processing system. These and other components of the wheel track monitoring system may be housed in their own enclosure or enclosures or may be integrated in other control systems and/or electronic enclosures of the irrigation system.

The wheel track condition sensor senses a condition of a wheel track created by the irrigation system and generates corresponding wheel track condition data. The condition sensed by the sensor may be a width of the wheel track, a depth of the wheel track, and/or a water content of soil within the wheel track. In some embodiments, the sensor may be a light detection and ranging (LIDAR) sensor, a radio detection and ranging (RADAR) sensor, a camera, and/or an ultrasonic distance measuring sensor. In some embodiments, a wheel track condition sensor is mounted to or near each mobile tower of the irrigation system so that all wheel tracks of the irrigation system may be monitored.

The location sensor senses locations of the agricultural irrigation system as it travels across an irrigated field and generates corresponding location data. In some embodiments, the location sensor may be a GPS receiver or other global navigation satellite system (GNSS) receiver that tracks coordinates of the mobile tower on which the wheel track condition sensor is mounted. In other embodiments, the location sensor may be an angle encoder, cam switch, proximity switch, optical encoder, potentiometer, light bar sensor, or other mechanism for determining relative angular positions of the mobile tower. In some embodiments, a location sensor is mounted to or near each mobile tower to capture location data for all the mobile towers as they travel along all the wheel tracks.

The processing system periodically or continuously receives and stores the wheel track condition data and the location data as the irrigation system travels across a field and creates a log of the wheel track condition data for multiple locations in the field. The processing system may also store the date and time the wheel track condition data and location data was obtained so the log indicates the condition of the wheel track over time. This log may be accessed to determine if the condition of the wheel track is deteriorating, and if so, how rapidly.

The processing system also analyzes the wheel track condition data to determine if the condition of the wheel track is unacceptable and/or deteriorating at any locations in the irrigated field. In some embodiments, the processing system generates a corrective action signal if the condition is unacceptable. The corrective action signal indicates the locations at which the wheel track condition is unacceptable and may indicate how or why the wheel condition is unacceptable.

The processing system may determine if the condition of the wheel track is unacceptable and/or deteriorating by comparing the wheel track condition data to threshold condition levels. For example, the processing system may compare the depth of a portion of the wheel track to a threshold depth and deem the condition of the wheel track unacceptable if the measured/sensed depth exceeds the threshold depth. The threshold depth may be selected by an operator and may vary from field to field and even for different locations within the same field.

In other embodiments, the processing system may determine if the condition of the wheel track is unacceptable and/or deteriorating by comparing current wheel track condition data to historical wheel track condition data to determine if the condition of the wheel track has deteriorated over time. For example, the processing system may compare the current depth of a portion of the wheel track to a depth sensed a week before and deem the condition of the wheel track unacceptable if the current depth has changed more than a threshold amount. The threshold may be selected by an operator and may vary from field to field and even for different locations within the same field.

In some embodiments, the processing system transmits the corrective action signal to a remote computer, smart phone, or control station so a farmer or other operator may take corrective action. The farmer or other operator may, for example, stop the irrigation system until the unacceptable portion of the wheel track is remedied, alter the amount of water delivered by the irrigation system, empty water from the irrigation system, and/or alter the speed of the irrigation system.

In other embodiments, the processing system transmits the corrective action signal to an irrigation control system that controls operation of the agricultural irrigation system. In these embodiments, the corrective action signal includes instructions for operating the agricultural irrigation system so as to overcome adverse conditions of the wheel track. Or, such instructions may be developed by the irrigation control system based on data sent by the processing system of the wheel track monitoring system. Such instructions may include, for example, stopping movement of the irrigation system until the adverse conditions are remedied, increasing or decreasing a ground speed of the irrigation system so it can more easily pass over a portion of wheel track with ruts, stopping water discharge from the irrigation system, draining water from the irrigation system before it passes over ruts so it is lighter when it traverses the ruts, reversing direction of the irrigation system, and/or changing a steering direction of the irrigation system.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures. For example, the principles of the present invention are not limited to center pivot irrigation systems but may be implemented in other types of mobile system that develop wheel tracks.

BRIEF DESCRIPTION OF THE DRAWING FIGURES

Embodiments of the present invention are described in detail below with reference to the attached drawing figures, wherein.

Figure 1:
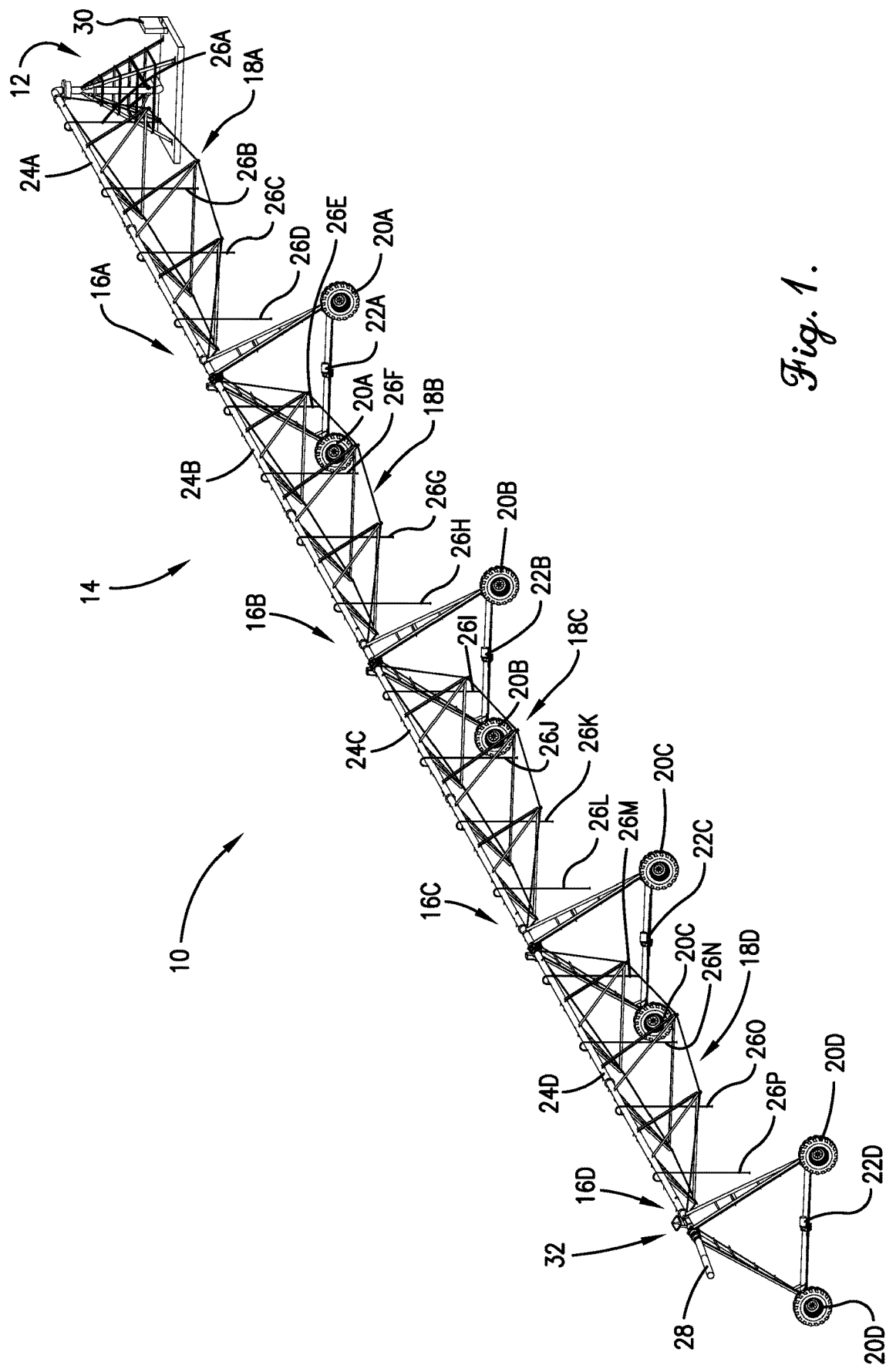
FIG. 1 is a perspective view of an exemplary center pivot irrigation system on which a wheel track monitoring system constructed in accordance with embodiments of the present invention may be used.

The drawing figures do not limit the present invention to the specific embodiments disclosed and described herein. The drawings are not necessarily to scale, emphasis instead being placed upon clearly illustrating the principles of the invention.

DETAILED DESCRIPTION

The present invention provides a wheel track monitoring system for an irrigation system. The wheel track monitoring system monitors the condition of at least one wheel track formed by the irrigation system and alerts an operator and/or automatically takes corrective action when the wheel track develops ruts or other conditions that may adversely affect operation of the irrigation system. The wheel track monitoring system may also be used with other mobile systems that develop wheel tracks.

An exemplary irrigation system 10 with which the wheel track monitoring system may be used is shown in FIG. 1. The illustrated irrigation system 10 is a center pivot irrigation system, but it may also be a linear move or lateral type irrigation system or any other type of automated irrigation system. The illustrated irrigation system 10 broadly comprises a fixed center pivot 12 and a main section 14 pivotally connected to the center pivot.

The fixed center pivot 12 may be a tower or any other support structure about which the main section 14 pivots. The center pivot has access to a well, water tank, or other source of water and may also be coupled with a tank or other source of agricultural products to inject fertilizers, pesticides and/or other chemicals into the water for application during irrigation.

The main section 14 pivots or rotates about the center pivot 12 and includes a number of mobile support towers 16A-D, the outermost 16D of which is referred to herein as an end tower. The mobile towers are connected to the fixed center pivot 12 and to one another by truss sections 18A-D or other supports to form a number of interconnected spans. The illustrated irrigation system 10 has four mobile support towers, and thus four spans, however, it may comprise any number of towers and spans without departing from the scope of the invention.

The mobile towers have wheels 20A-D driven by drive motors 22A-D. Each motor 22A-D turns at least one of the wheels 22A-D through a drive shaft to move its mobile tower and thus the main section 14 in a circle or semi-circle about the center pivot 12. The motors 22A-D may include integral or external relays so they may be turned on, off, and reversed by a control system described below. The motors may also have several speeds or be equipped with variable speed drives.

Although not required, some or all of the towers 16A-D may be equipped with steerable wheels pivoted about upright axes by suitable steering motors so that the towers can follow a predetermined track. As is also well known, the drive motors for the towers are controlled by a suitable safety system such that they may be slowed or completely shut down in the event of the detection of an adverse circumstance.

The mobile towers 16A-D and the truss sections 18A-D carry or otherwise support inter-connected conduit sections 24A-D or other fluid distribution mechanisms that are connected to a source of fluids from the center pivot. A plurality of sprinkler heads, spray guns, drop nozzles, or other water emitters 26A-P are spaced along the conduit sections 24A-D to apply water and/or other fluids to land underneath the irrigation system.

One or more valves may be disposed between the conduit sections 24A-D and the water emitters 26A-P to control the flow of water through the water emitters. In some embodiments, the irrigation system includes several valves, and each valve controls the flow of water through a single water emitter such that each water emitter can be individually opened, closed, pulsed, etc. to emit any amount of water. In other embodiments, the irrigation system 10 includes several valves that each control the flow of water through a group of water emitters such that the group of water emitters is controlled to emit a specific amount of water. For example, each span of the irrigation system may include four water emitters, and one valve may control the water flow through all four water emitters such that all of the water emitters on a span operate in unison. The valves may be magnetic latching solenoid valves that are normally biased to an off/closed state such that the valves only switch to an on/open state when powered, but they may be any type of valve.

The irrigation system 10 may also include a flow meter that measures water flow rates through the system. Outputs from the flow meter may be provided to the control system. In one embodiment, a single flow meter measures flow rates through the entire irrigation system and provides an indication of this aggregate flow rate to the control system. In other embodiments, multiple flow meters provide flow-rate measurements through different portions of the irrigation system, such as through each span of the irrigation system or even each water emitter.

Embodiments of the irrigation system 10 may also include a pressure regulator for regulating the pressure of water through the irrigation system. Pumps that provide water to the irrigation system may be configured to provide a minimum water pressure, and the pressure regulator then reduces the pump water pressure to a selected maximum pressure level such that the pumps and pressure regulator together provide a relatively constant water pressure through the irrigation system.

The irrigation system 10 may also comprise other components such as an extension arm (also commonly referred to as a "swing arm" or "corner arm") pivotally connected to the free end of the main section and/or one or more high pressure sprayers or end guns 28 mounted to the end tower 16D or to the end of the extension arm. The end guns are activated at the corners of a field or other designated area to increase the amount of land that can be irrigated.

The irrigation system 10 may also comprise a control system 30 for controlling operation of the irrigation system. The control system can be located anywhere, such as in a panel beside the center pivot 12 as shown in FIG. 1, and can be implemented with hardware, software, firmware, or a combination thereof. One embodiment of the control system 30 may comprise a processing element, controller, or other computing device; conventional input devices such as knobs, buttons, switches, dials, etc.; inputs for receiving programs and data from external devices; one or more displays; a cellular or other radio transceiver for wirelessly receiving and transmitting data from and to remote devices; a Bluetooth transceiver; a Wi-Fi transceiver; and/or other electronic components.

The control system 30 controls operational aspects of the irrigation system such as the speed and direction of the mobile towers, and hence the speed of the irrigation system, via control signals provided to the relays connected to the motors 22A-D of the mobile towers 11A-D. Likewise, the control system 30 controls the water flow through the water emitters 26A-P via control signals provided to the relays connected to the valves 28A-D. The control system 30 may also control other operational aspects such as a fertilizer application rate, a pesticide application rate, end gun operation, mobile tower direction (forward or reverse), and/or system start-up and/or shut-down procedures.

The control system 30 may control some of the above-described operational aspects of the irrigation system in accordance with an irrigation plan (also sometimes referred to as a "sprinkler chart" or "watering plan"). An irrigation plan specifies how much water to apply to a field, and sometimes to different portions of a field, based on various different criteria such as the types of crops to be irrigated; the soil conditions in various parts of the field; the existence of slopes, valleys, etc. in the field; the existence of roads, buildings, ponds, and boundaries that require no irrigations; crop growth cycles; etc. One or more irrigation plans may be created then stored in memory associated with the control system.

Figure 2:
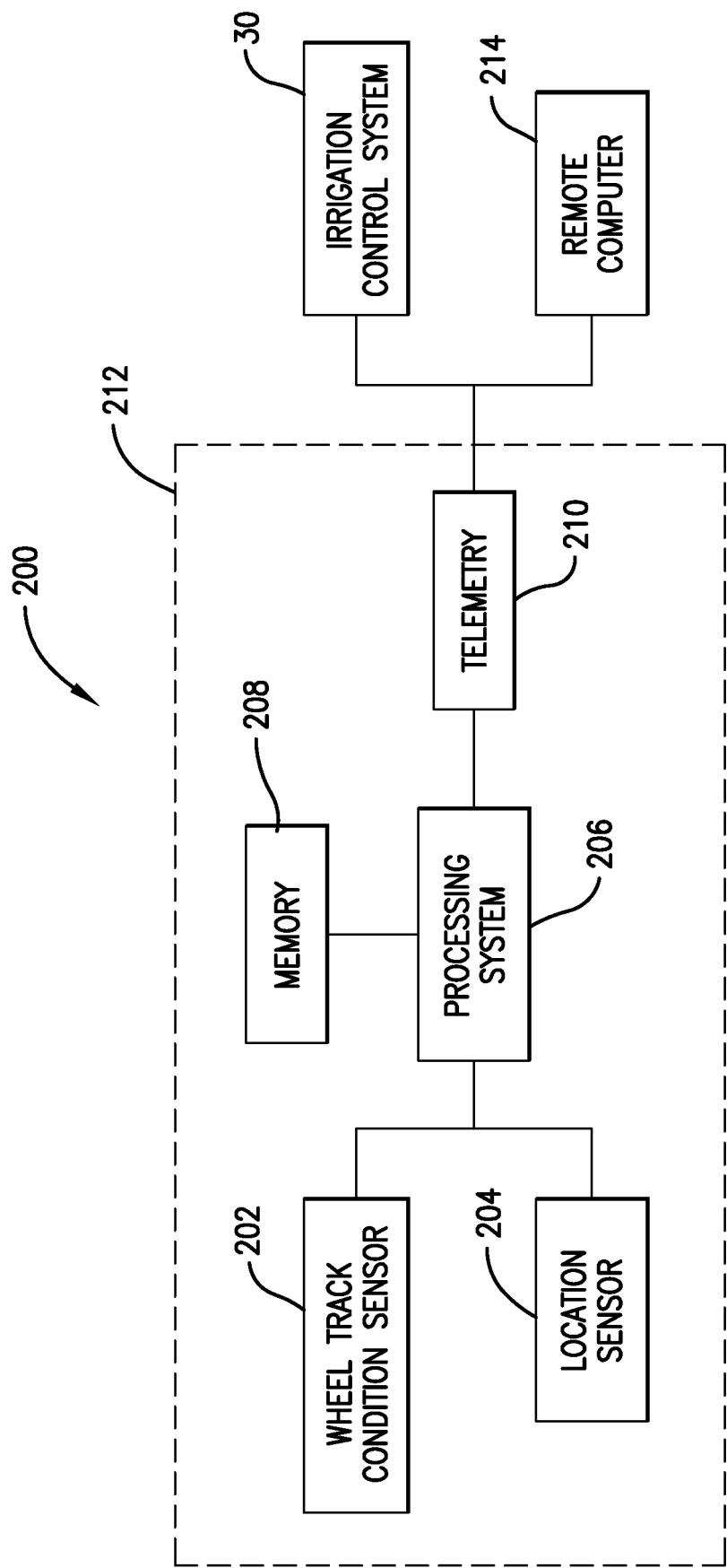
FIG. 2 is a block diagram depicting selected components of an embodiment of the wheel track monitoring system.

A wheel track monitoring system 200 constructed in accordance with embodiments of the invention is depicted in FIG. 2. The wheel track monitoring system broadly comprises a wheel track condition sensor 202, a location sensor 204, and a processing system 206. The wheel track monitoring system 200 may also comprise memory 208 and a telemetry unit 210. The wheel track monitoring system may also include its own power source for powering the wheel track condition sensor, the location sensor, and/or the processing system. The components of the wheel track monitoring system may be housed in one or more enclosures 212 or may be integrated in the enclosures of other control systems or electronic devices on the irrigation system.

The wheel track condition sensor 202 senses a condition of at least one wheel track created by the agricultural irrigation system 10 and generates corresponding wheel track condition data. The condition sensed by the sensor may be a width of the wheel track, a depth of the wheel track, and/or a water content of soil within the wheel track. The condition sensed may also be the presence of obstacles in the wheel track such as rocks, tree limbs, etc.

The wheel track condition sensor 202 may be mounted anywhere on the irrigation system 10 but is preferably mounted to one of the mobile towers. In some embodiments, a wheel track condition sensor is mounted to or near each mobile tower so all wheel tracks of the irrigation system may be monitored.

The wheel track condition sensor 202 may be any sensor or combination of sensors that can monitor or sense aspects of the wheel track and generate corresponding wheel track condition data. In some embodiments, the sensor may be a light detection and ranging (LIDAR) sensor or a radio detection and ranging (RADAR) sensor for sensing widths and/or depths of ruts in the wheel track. In other embodiments, the sensor may be a camera for capturing images of the wheel track for comparison with previously captured images as discussed in more detail below. In still other embodiments, the sensor may be an ultrasonic distance measuring sensor for sensing measurements of the wheel track.

The wheel track condition sensor 202 may also indirectly sense conditions of the wheel track. For example, the wheel track condition sensor may be a vibration sensor that senses vibrations of the irrigation system which indicate the irrigation system is travelling over ruts. Similarly, the wheel track condition sensor may monitor current draw of the motors on the mobile towers to sense wheel slippage or stoppage indicative of muddy wheel tracks.

The location sensor 204 senses locations of the irrigation system 10 as it travels across an irrigated field and generates corresponding location data. The location sensor may be mounted anywhere on the irrigation system but is preferably mounted to one of the mobile towers. In some embodiments, a location sensor is mounted to or near each mobile tower to capture location data for all the mobile towers as they travel along all the wheel tracks.

In some embodiments, the location sensor 204 may be a global navigation satellite system (GNSS) receiver such as a GPS receiver, Glonass receiver, Galileo receiver, or compass system receiver operable to receive navigational signals from satellites to calculate positions of the mobile towers as a function of the signals. The GNSS receiver may include one or more processors, controllers, or other computing devices and memory for storing information accessed and/or generated by the processors or other computing devices and may include or be coupled with a patch antenna, helical antenna, or any other type of antenna. The location sensor may calculate positions of the irrigation system and generate corresponding position signals to be sent to the processing system 206 and/or transmitted by the telemetry unit 210 or may simply relay satellite signals to the processing system or telemetry unit so that the processing system 206 or the remote computer 214 may calculate the positions of the irrigation system.

The location sensor 204 may also comprise other type of receiving devices capable of receiving location information from at least three transmitting locations and performing basic triangulation calculations to determine the relative position of the receiving device with respect to the transmitting locations. For example, cellular towers or any customized transmitting radio frequency towers can be used instead of satellites. With such a configuration, any standard geometric triangulation algorithm can be used to determine the exact location of the receiving unit.

In other embodiments, the location sensor 204 may be an angle encoder, cam switch, proximity switch, optical encoder, potentiometer, light bar sensor, or other mechanism for determining relative angular positions of one or more of the mobile towers with respect to the fixed center pivot 12.

The processing system 206 may comprise or include any number or combination of processors, controllers, ASICs, computers or other control circuitry and includes data inputs for receiving data from the sensors 202, 204 and outputs connected to the telemetry unit 210. The processing system may also comprise internal or external memory 208 for storing the sensor signals, the location signals, and/or other signals and data. The memory 208 may be any electronic memory that can be accessed by processing elements and operable for storing instructions or data. The memory may be integral with the processing system 206 or may be a stand-alone device. The memory 208 may be a single component or may be a combination of components that provide the requisite functionality. The memory may include various types of volatile or non-volatile memory such as flash memory, optical discs, magnetic storage devices, SRAM, DRAM, or other memory devices capable of storing data and instructions. The memory may communicate directly with the processing elements or may communicate over a bus or other mechanism that facilitates direct or indirect communication.

The telemetry unit 210 is coupled with the processing system 206 and is operable for transmitting data and signals to the remote computer 214 and/or the irrigation control system 30. The transmitted data and signals may include, for example, the wheel track condition data, the location data, and the corrective action signal described above and below. The telemetry unit 42 may include one or more transceiver elements. The transceiver elements may include signal or data transmitting and receiving circuits, such as antennas, amplifiers, filters, mixers, oscillators, digital signal processors (DSPs), and the like. The transceiver elements may establish communication wirelessly by utilizing radio frequency (RF) signals and/or data that comply with communication standards such as cellular 2G, 3G, 4G or 5G, Institute of Electrical and Electronics Engineers (IEEE) 802.11 standard such as WiFi, IEEE 802.16 standard such as WiMAX, Bluetooth™, or combinations thereof. In addition, the transceiver elements may utilize communication standards such as ANT, ANT+, Bluetooth™ low energy (BLE), the industrial, scientific, and medical (ISM) band at 2.4 gigahertz (GHz), or the like.

The processing system 206 periodically or continuously receives and stores the wheel track condition data and the location data as the irrigation system travels across a field to create a log of wheel track condition data for multiple locations in the field. The processing system 206 may also store the date and time the wheel track condition data and location data was obtained so the log indicates the condition of the wheel track over time. The data may be stored in the memory 208 or other memory accessible by the processing system 206 and/or may be transmitted to a remote computer system 214 by the telemetry unit 210. The log or any data in the log may be accessed to determine if the condition of the wheel track is deteriorating, and if so, how rapidly.

The processing system 206 also analyzes the wheel track condition data to determine if the condition of the wheel track is unacceptable at any locations in the irrigated field. In some embodiments, the processing system 206 generates a corrective action signal if the condition is unacceptable. The corrective action signal indicates the locations at which the wheel track condition is unacceptable and may indicate how or why the wheel condition is unacceptable.

The processing system 206 may determine if the condition of the wheel track is unacceptable by comparing the wheel track condition data to threshold condition levels. For example, the processing system 206 may compare the depth of the wheel track to a threshold depth and deem the condition of the wheel track unacceptable if the measured/sensed depth exceeds the threshold depth. The threshold depth may be selected by an operator and may vary from field to field and even for different locations within the same field.

In other embodiments, the processing system 206 determines if the condition of the wheel track is unacceptable by comparing current wheel track condition data to historical wheel track condition data to determine if the condition of the wheel track has deteriorated over time. For example, the processing system 206 may compare the current depth of the wheel track to the depth sensed a week before and deem the condition of the wheel track unacceptable if the current depth is a threshold percentage or amount greater than the historical depth. The threshold may be selected by an operator and may vary from field to field and even for different locations within the same field.

In some embodiments, the processing system 206 transmits the corrective action signal to the remote computer 214, smart phone, or control station so a farmer or other operator may take corrective action. The farmer or other operator may, for example, stop the irrigation system until the unacceptable portion of the wheel track is remedied, alter the amount of water delivered by the irrigation system, and/or alter the speed of the irrigation system.

In other embodiments, the processing system 206 transmits the corrective action signal to the irrigation control system 30 that controls operation of the agricultural irrigation system 10. In these embodiments, the corrective action signal includes instructions for operating the agricultural irrigation system 10 so as to overcome adverse conditions of the wheel track. Such instructions may include, for example, stopping movement of the agricultural irrigation system until the adverse conditions are remedied, increasing or decreasing a ground speed of the agricultural irrigation system so it can more easily pass over a portion of wheel track with ruts, stopping water discharge from the agricultural irrigation system, draining water from the agricultural irrigation system before it passes over ruts so it is lighter when it traverses the ruts, reversing direction of the agricultural irrigation system, and/or changing a steering direction of the agricultural irrigation system.

The housing 212 may be positioned and attached anywhere on the irrigation system 10 and may be constructed from any suitable vibration- and impact-resistant materials such as, for example, plastic, nylon, aluminum, or any combination thereof and may include one or more appropriate gaskets or seals to make it substantially waterproof or water resistant. Although the electronic components of the system are preferably mounted together within the housing 212, they need not be, since wireless communication among the various depicted components is possible and intended to fall within the scope of the present invention. Thus, components of the system may be located remotely from the housing 212 and from each other.

Figure 3:
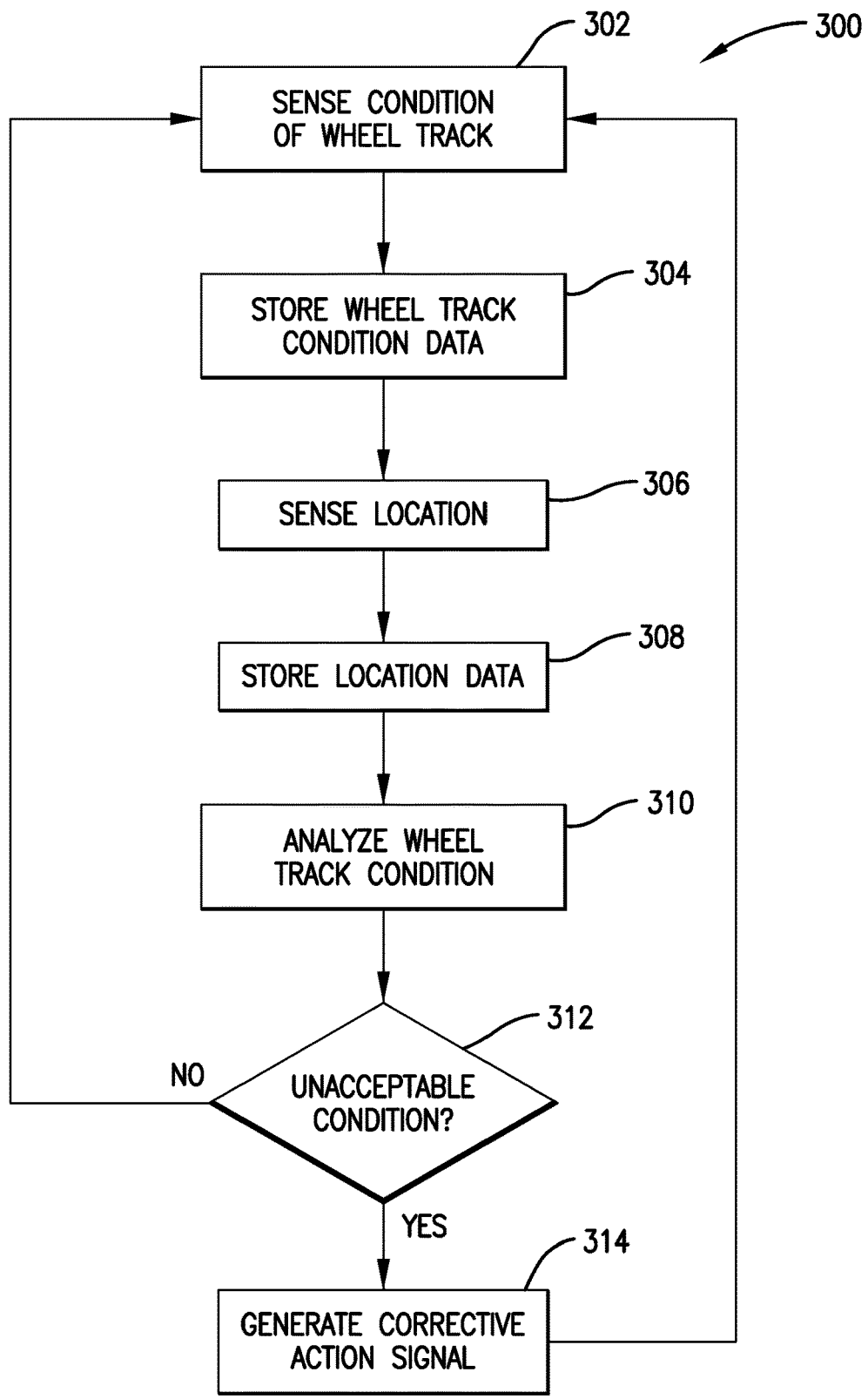
FIG. 3 is a flow diagram depicting exemplary steps in a method of the present invention or portions of a computer program of an embodiment of the present invention.

Operation of the above-described wheel track monitoring system 200 will now be described with reference to FIG. 3. The flow chart of FIG. 3 shows the functionality and operation of an exemplary method 300 of the present technology. Some of the blocks of the flow chart may represent a step in the method 300 and/or a module section or portion of code of computer programs that operate the processing system 208. In some alternative implementations, the functions noted in the various blocks may occur out of the order depicted in FIG. 3. For example, two blocks shown in succession in FIG. 3 may in fact be executed substantially concurrently, or the block may sometimes be executed in the reverse order depending upon the functionality involved.

The method 300 begins in step 302 where the wheel track condition sensor 202 or other sensor senses a condition of a wheel track created by the agricultural irrigation system 10 and generates corresponding wheel track condition data.

In step 304, the wheel track condition data is stored in the memory 208 or other memory and/or transmitted and stored in the remote computer system 214.

In step 306, the location sensor 204 or other sensor senses at least one location of the agricultural irrigation system 10 and generates corresponding location data.

In step 308, the location data is stored in the memory 208 and/or transmitted and stored in the remote computer system 214. Steps 304 and 306 preferably store the wheel track condition data and the location data for a plurality of locations of the agricultural irrigation system as it moves across an irrigated field.

In steps 310 and 312, the processing system 206 analyzes the wheel track condition data to determine if the condition of the wheel track is unacceptable at any locations of the agricultural irrigation system as it moves across an irrigated field.

In step 314, the processing system 206 generates a corrective action signal if the condition of the wheel track is unacceptable at any locations of the agricultural irrigation system. The corrective action signal indicates the locations at which the condition of the wheel track is unacceptable and includes at least a portion of the wheel track condition data for each of the locations at which the condition of the wheel track is unacceptable. The corrective action signal may be transmitted to a remote computer, smart phone, or control station so a farmer or other operator may take corrective action. Alternatively, the corrective action signal may be transmitted to an irrigation control system that controls operation of the agricultural irrigation system to provide instructions for operating the agricultural irrigation system so as to overcome adverse conditions of the wheel track.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. For example, the principles of the present invention are not limited to the illustrated center pivot irrigation systems but may be implemented in any type of irrigation system including linear move irrigation systems.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Some of the functions described herein may be implemented with one or more computer programs executed by the processing system 206. Each computer program comprises an ordered listing of executable instructions for implementing logical functions and can be embodied in any computer-readable medium for use by or in connection with an instruction execution system, apparatus, or device that can fetch the instructions and execute the instructions. In the context of this application, a "computer-readable medium" can be any means that can contain, store, communicate, propagate or transport the program for use by or in connection with the instruction execution system, apparatus, or device including, but not limited to, the memory 208. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a random access memory (RAM), a read-only memory (ROM), an erasable, programmable, read-only memory (EPROM or Flash memory), an optical fiber, and a portable compact disk read-only memory (CDROM).

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, processing elements such as the processing system 206 may be implemented as special purpose computers or as general purpose computers. For example, the electronic circuits may comprise dedicated circuitry or logic that is permanently configured, such as an application-specific integrated circuit (ASIC), or indefinitely configured, such as an FPGA, to perform certain operations. The electronic circuits may also comprise programmable logic or circuitry (e.g., as encompassed within a general-purpose processor or other programmable processor) that is temporarily configured by software to perform certain operations. It will be appreciated that the decision to implement the electronic circuits as special purpose, in dedicated and permanently configured circuitry, or as general purpose (e.g., configured by software) may be driven by cost and time considerations.

Accordingly, the terms "processing system," "electronic circuits," "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the electronic circuits are temporarily configured (e.g., programmed), each of the processing elements need not be configured or instantiated at any one instance in time. For example, where the electronic circuits comprise a general-purpose processor configured using software, the general-purpose processor may be configured as respective different processing elements at different times. Software may accordingly configure the electronic circuits to constitute a hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of the method 300 may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Having thus described the preferred embodiment of the invention, what is claimed as new and desired to be protected by Letters Patent includes the following:

1. A wheel track monitoring system for an agricultural mobile irrigation system, the wheel track monitoring system comprising:
   a wheel track condition sensor comprising a LIDAR sensor for sensing a condition of a wheel track created by the mobile irrigation system and generating corresponding wheel track condition LIDAR data, wherein the condition of the wheel track is formed behind the mobile irrigation system;
   a processing system in communication with the wheel track condition sensor and operable to—
      analyze the wheel track condition LIDAR data to determine if the condition of the wheel track is unacceptable;

generate a corrective action signal if the condition of the wheel track is unacceptable at any locations of the mobile irrigation system, the corrective action signal including instructions for adjusting a water application rate of the mobile irrigation system; and transmit the corrective action signal to a control system that controls operation of the mobile irrigation system.

2. The wheel track monitoring system as set forth in claim 1, further comprising a location sensor for sensing locations of the mobile irrigation system and generating corresponding location data.

3. The wheel track monitoring system as set forth in claim 2, wherein the processing system is further operable to store the wheel track condition LIDAR data and the location data for a plurality of locations of the mobile irrigation system as it moves.

4. The wheel track monitoring system as set forth in claim 3, wherein the corrective action signal indicates the locations at which the condition of the wheel track is unacceptable.

5. The wheel track monitoring system as set forth in claim 3, wherein the corrective action signal includes at least a portion of the wheel track condition LIDAR data for each of the locations at which the condition of the wheel track is unacceptable.

6. The wheel track monitoring system as set forth in claim 1, further comprising a telemetry unit for transmitting the corrective action signal to a computer device remote from the wheel track monitoring system.

7. The wheel track monitoring system as set forth in claim 1, wherein the condition of the wheel track sensed by the wheel track condition sensor is a condition selected from the group consisting of a width of the wheel track, a depth of the wheel track, and a water content of soil within the wheel track.

8. The wheel track monitoring system as set forth in claim 7, wherein the processing system determines if the condition of the wheel track is unacceptable by comparing the wheel track condition LIDAR data to historical wheel track condition LIDAR data to determine if the condition of the wheel track has deteriorated over time.

9. The wheel track monitoring system as set forth in claim 7, wherein the processing system determines if the condition of the wheel track is unacceptable by comparing the wheel track condition LIDAR data to threshold condition levels.

10. The wheel track monitoring system as set forth in claim 2, wherein the location sensor is a GNSS receiver.

11. The wheel track monitoring system as set forth in claim 1, wherein the instructions for operating the agricultural irrigation system are instructions selected from the group consisting of stopping movement of the agricultural irrigation system, increasing a speed of the agricultural irrigation system, increasing a speed of the agricultural irrigation system, stopping water discharge from the agricultural irrigation system, draining water from the agricultural irrigation system, reversing direction of the agricultural irrigation system, and changing steering direction of the agricultural irrigation system.

12. The wheel track monitoring system as set forth in claim 1, wherein the processing system is further operable to store temporal information corresponding to when the wheel track condition LIDAR data was generated.

13. A wheel track monitoring system for an agricultural mobile irrigation system, the wheel track monitoring system comprising:

a wheel track condition sensor comprising a RADAR sensor for sensing a condition of a wheel track created by the agricultural mobile irrigation system and generating corresponding wheel track condition RADAR data, wherein the condition of the wheel track is formed behind the agricultural mobile irrigation system;

a location sensor for sensing locations of the agricultural mobile irrigation system and generating corresponding location data;

a processing system in communication with the wheel track condition sensor and the location sensor and operable to— store the wheel track condition RADAR data and the location data for a plurality of locations of the agricultural mobile irrigation system as it moves across an irrigated field;

analyze the wheel track condition RADAR data to determine if the condition of the wheel track is unacceptable at any locations of the agricultural mobile irrigation system as it moves across an irrigated field;

generate a corrective action signal if the condition of the wheel track is unacceptable at any locations of the agricultural mobile irrigation system, wherein the corrective action signal indicates the locations at which the condition of the wheel track is unacceptable and includes at least a portion of the wheel track condition RADAR data for each of the locations at which the condition of the wheel track is unacceptable, wherein the corrective action includes instructions to adjust a water application rate of the agricultural mobile irrigation system.

14. The wheel track monitoring system as set forth in claim 13, further comprising a telemetry unit for transmitting the corrective action signal to a computer device remote from the wheel track monitoring system.

15. The wheel track monitoring system as set forth in claim 13, wherein the condition of the wheel track sensed by the wheel track condition sensor is a condition selected from the group consisting of a width of the wheel track, a depth of the wheel track, and a water content of soil within the wheel track.

16. The wheel track monitoring system as set forth in claim 13, wherein the processing system determines if the condition of the wheel track is unacceptable by comparing the wheel track condition RADAR data to historical wheel track condition RADAR data to determine if the condition of the wheel track has deteriorated over time.

17. The wheel track monitoring system as set forth in claim 13, wherein the processing system determines if the condition of the wheel track is unacceptable by comparing the wheel track condition RADAR data to threshold condition levels.

18. An agricultural mobile irrigation system comprising:
a plurality of spaced-apart and interconnected mobile towers;
a fluid distribution conduit supported by the mobile towers and connected to a source of fluids;
a plurality of fluid emitters connected to the fluid distribution conduit for applying fluids to fields underneath the agricultural irrigation system;
a control system for controlling a speed and direction of the mobile towers and application of the fluids by the fluid emitters; and
a wheel track monitoring system comprising:
a wheel track condition sensor comprising a camera for sensing a condition of a wheel track created by the mobile towers and generating corresponding wheel track condition image data, wherein the condition of the wheel track is formed behind the mobile towers;

a processing system in communication with the wheel track condition sensor and the control system, the processing system being operable to— analyze the wheel track condition image data to determine if the condition of the wheel track is unacceptable, wherein the condition of the wheel track comprises a water content of soil within the wheel track;

generate a corrective action signal if the condition of the wheel track is unacceptable at any locations of the agricultural irrigation system the corrective action signal including an instruction to adjust a water application rate.

* * * * *